(12) United States Patent
Prather et al.

(10) Patent No.: US 6,513,376 B1
(45) Date of Patent: Feb. 4, 2003

(54) LIQUID LEVEL HEIGHT MEASUREMENT SYSTEM

(75) Inventors: Zachary A. Prather, Troutdale, OR (US); David A. Stacey, Portland, OR (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/974,251

(22) Filed: Oct. 10, 2001

(51) Int. Cl.$^7$ .......................... G01F 23/14; G01F 23/00
(52) U.S. Cl. ....................... 73/299; 73/290 R
(58) Field of Search .............................. 73/290 R, 299, 73/301

(56) References Cited

U.S. PATENT DOCUMENTS 5,163,324 A * 11/1992 Stewart ..................... 73/302
6,220,091 B1 * 4/2001 Chen et al. ................ 73/302

* cited by examiner

Primary Examiner—Daniel S. Larkin
Assistant Examiner—Rodney Frank
(74) Attorney, Agent, or Firm—Luedeka, Neely & Graham

(57) ABSTRACT

A system for indicating an amount of a process liquid contained within an interior of an ampoule. A first conduit is in selective fluid communication with the interior of the ampoule, and has a first opening configured for disposal below an upper surface of the process liquid. The first conduit introduces a carrier gas into the interior of the ampoule. A second conduit is also in selective fluid communication with the interior of the ampoule, and has a second opening configured for disposal above the upper surface of the process liquid. The second conduit receives the carrier gas from the interior of the ampoule. A pressure differential sensor is disposed between and is in selective fluid communication with the first conduit and the second conduit. The pressure differential sensor senses a pressure differential between the first conduit and the second conduit. An indicator indicates the amount of the process liquid in the ampoule, based at least in part upon the pressure differential between the first conduit and the second conduit. Thus, the system as described above provides selectively continuous monitoring of the amount of the process liquid that is in the ampoule. Furthermore, the system monitors the amount in real time, and is relatively inexpensive to implement in a new chemical vapor deposition system, or to add to an existing chemical vapor deposition system.

17 Claims, 4 Drawing Sheets

LIQUID LEVEL HEIGHT MEASUREMENT SYSTEM

FIELD

This invention relates to the field of process control. More particularly, the invention relates to monitoring the height of a liquid in a container as the fluid is used during a process step of manufacturing an integrated circuit.

BACKGROUND

In processing integrated circuits, such as semiconductor devices, titanium nitride is often deposited by metal organic chemical vapor deposition (MOCVD) to achieve highly conformal step coverage, such as in high aspect ratio vias and contacts. Typically, the deposition process employs tetrakis-dimethylamino titanium (TDMAT) as the precursor chemical. To transfer TDMAT into the deposition chamber, a carrier gas, such as helium, is bubbled through liquid phase TDMAT that is provided in a heated ampoule. The carrier gas conveys the TDMAT in the vapor phase to the deposition chamber.

During processing, care is typically used to ensure that the TDMAT ampoule does not run empty or below a minimum threshold amount, such as a minimum height level within the ampoule. If the TDMAT liquid in the ampoule drops below the minimum threshold amount, the desired thickness of titanium nitride may not be deposited during the MOCVD process, typically resulting in a significant reduction in process yield.

Several approaches to monitoring TDMAT levels have been attempted, including (1) estimating the TDMAT usage based on a processed substrate count, (2) using a pressurizing test to determine the empty volume in the ampoule, (3) using discrete level sensors in the ampoule, which sense an object floating on the liquid and detect the location of the floating object as it passes by discrete points, and (4) using sonic level sensors in the ampoule. However, each of these prior methods have significant disadvantages which limit their effectiveness and applicability. For example, the first method provides an inaccurate estimation, the second method cannot be accomplished in real-time and is too time-consuming and obtrusive, and the third and fourth methods are cost-prohibitive.

What is needed, therefore, is a system for real-time, continuous, unobtrusive, and inexpensive monitoring of a process liquid level in an ampoule.

SUMMARY

The above and other needs are met by a system for indicating an amount of a process liquid contained within an interior of an ampoule. A first conduit is in selective fluid communication with the interior of the ampoule, and has a first opening configured for disposal below an upper surface of the process liquid. The first conduit introduces a carrier gas into the interior of the ampoule. A second conduit is also in selective fluid communication with the interior of the ampoule, and has a second opening configured for disposal above the upper surface of the process liquid. The second conduit receives the carrier gas from the interior of the ampoule.

A pressure differential sensor is disposed between and is in selective fluid communication with the first conduit and the second conduit. The pressure differential sensor senses a pressure differential between the first conduit and the second conduit. An indicator indicates the amount of the process liquid in the ampoule, based at least in part upon the pressure differential between the first conduit and the second conduit.

Thus, the system as described above provides selectively continuous monitoring of the amount of the process liquid that is in the ampoule. Furthermore, the system monitors the amount in real time, and is relatively inexpensive to implement in a new chemical vapor deposition system, or to add to an existing chemical vapor deposition system.

In various preferred embodiments of the invention, the amount of the process liquid in the ampoule is expressed as a height of the process liquid, such as a height from the bottom of the ampoule to the upper surface of the process liquid, or a height from the first opening of the first conduit to the upper surface of the process liquid. The pressure differential sensor is preferably a manometer, and most preferably a U tube manometer containing manometric fluid, and having a first arm in fluid communication with the first conduit and a second arm in fluid communication with the second conduit.

In one preferred embodiment, graduated indicia on at least one of the first arm and the second arm of the U tube manometer indicate a difference in height of the manometric fluid in the first arm and the second arm. A conversion table indicates a height of the process liquid in the ampoule based at least in part upon the difference in height of manometric fluid in the first arm and the second arm. Alternately, the graduated indicia on at least one of the first arm and the second arm of the U tube manometer directly indicate a height of the process liquid in the ampoule, based at least in part upon the difference in height of manometric fluid in the first arm and the second arm.

In an especially preferred embodiment, the indication of the amount of the process liquid in the ampoule is based at least in part on:

$$h = \frac{\Delta P - C}{\rho \times g},$$

where h is a height of the process liquid in the ampoule, $\Delta P$ is the pressure differential between the first conduit and the second conduit, C is a constant based at least in part on a configuration of the ampoule, $\rho$ is a density of the process liquid, and g is an acceleration due to gravity.

According to other aspects of the invention there is provided a chemical vapor deposition system including the system for indicating an amount of a process liquid as described above, and a method for determining an amount of a process liquid in an ampoule.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
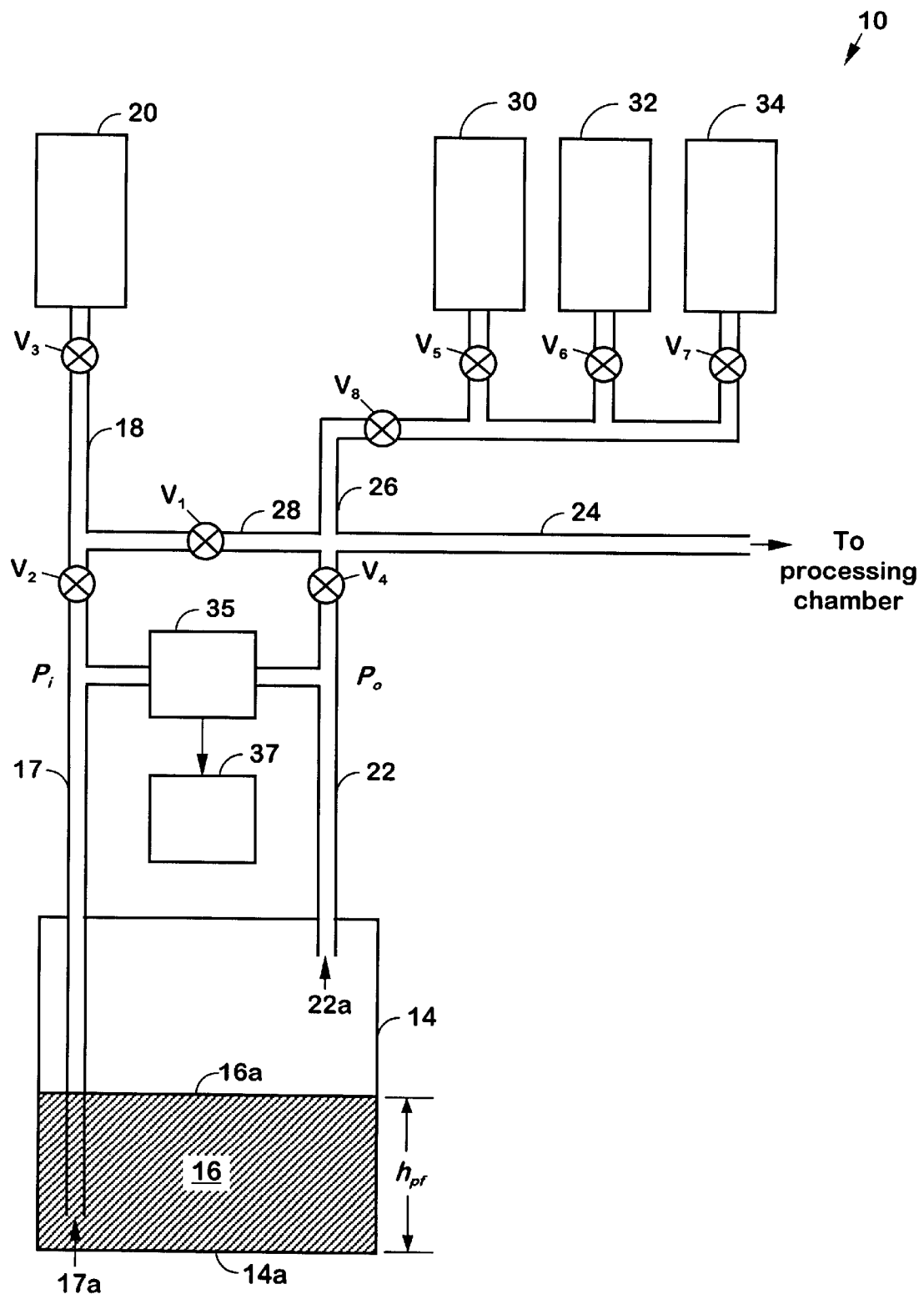
FIG. 1 depicts a liquid height measurement system according to a preferred embodiment of the present invention.

Referring now to FIG. 1, there is depicted a process liquid delivery system 10, such as is used in integrated circuit processing, such as may be part of a metal-organic chemical vapor deposition (MOCVD) system for depositing a layer of material on a substrate. The apparatus 10 includes an ampoule 14 containing a process liquid 16, such as liquid tetrakis-dimethylamino titanium (TDMAT). Preferably, the amount of TDMAT within the ampoule 14 at any given time during the deposition process is determined based on the height h of the process liquid 16. As shown in FIG. 1, the height h is in one embodiment measured from the bottom surface 14a of the interior of the ampoule 14 to the top surface 16a of the process liquid 16.

In preferred embodiments of the invention, two fluid conduits provide selective fluid communication to the interior of the ampoule 14. These include an first input conduit 17 and a second output conduit 22. An ampoule bypass line 28 and valve $V_1$ are provided between the input and output conduits 17 and 22. As depicted in FIG. 1, one end of the input conduit 17 has an opening 17a disposed below an upper surface 16a of the process liquid 16, such as adjacent the bottom interior surface 14a of the ampoule 14. The height h is in one embodiment measured from the opening 17a of the input conduit 17 to the top surface 16a of the process liquid 16. The other end of the input conduit 17 is preferably connected to a carrier gas line 18 via a valve $V_2$. The carrier gas line 18 is connected to a carrier gas source 20 via a valve $V_3$. In preferred embodiments of the invention, the carrier gas is helium.

With the valves $V_2$ and $V_3$ open (and $V_1$ closed), a positive pressure $P_i$ of carrier gas is provided in the input conduit 17, thereby causing carrier gas to emanate from the first opening 17a and bubble through the process liquid 16 in the ampoule 14. As the carrier gas bubbles through the process liquid 16, it picks up an amount of the process liquid 16 which is transferred in the vapor phase by the carrier gas into the portion of the interior of the ampoule 14 above the upper surface 16a of the process liquid 16, thereby creating a positive pressure $P_o$ within the output conduit 22. Due to forces such as frictional flow losses and the static head pressure of the process liquid 16, there is a pressure differential $\Delta P$ between the input pressure $P_i$ and the output pressure $P_o$. The process liquid vapor and the carrier gas flow into an opening 22a in the output conduit 22 that is disposed above the upper surface 16a of the process liquid 16. The process liquid vapor and carrier gas are transferred through the output conduit 22 and a valve $V_4$ into a line 24, such as one connected to an MOCVD processing chamber.

As depicted in FIG. 1, the apparatus 10 preferably includes diluent gas sources 30, 32, and 34 connected through valves $V_5$, $V_6$, $V_7$, and $V_8$ to a diluent line 26. In preferred embodiments, the diluent gas sources 30, 32, and 34 provide a mixture of nitrogen, hydrogen, and helium diluent gases to the MOCVD processing chamber via the lines 26 and 24.

It is appreciated that a preferred objective of the process liquid vapor delivery system as described herein is to ensure that a known and sufficient amount of the process liquid vapor is conducted to the processing chamber by the carrier gas. For example, if the carrier gas is at all times substantially completely saturated with the process liquid vapor at a reasonably known temperature and pressure, then the amount of the process liquid 16 delivered to the processing chamber can be determined based on the flow rate of the carrier gas and the length of time for which it flows. This in turn can be empirically related to a thickness of a deposited layer within the processing chamber.

However, if a variable changes in the system, such as if the carrier gas is not substantially completely saturated with the process liquid vapor, then the empirical relation to the thickness of the deposited layer is no longer valid. One of the variables that can effect whether the carrier gas is substantially completely saturated with the process liquid vapor is the height of the process liquid 16 above the outlet 17a of the inlet conduit 17. This height effects parameters such as the residence time of the carrier gas in the process liquid 16, which in large measure tends to determine how saturated the carrier gas will be with the process liquid vapor.

The height of the upper surface 16a of the process liquid 16 in the ampoule 14 may be accounted for in a variety of ways. For example, the height may be directly determined as a distance value from the upper surface 16a of the process liquid 16 to either the bottom 14a of the ampoule 14 or to the outlet 17a of the inlet conduit 17. It is appreciated that the distance from the outlet 17a of the inlet conduit 17 is the distance that most directly has an effect on the saturation of the carrier gas. However, with a knowledge of the distance of the outlet 17a of the inlet conduit 17 from the bottom 14a of the ampoule 14, the length of travel of the carrier gas through the process liquid 16 can be determined.

Further, the degree of saturation of the carrier gas can be empirically related to other properties associated with the system 10 as well. For example, with a knowledge of the volume, height, diameter, and other such physical properties of the ampoule 14, the weight of the process liquid 16 within the ampoule 14 can be empirically related to the degree of saturation of the carrier gas. Thus, for example, when the weight of the ampoule 14 drops below a certain previously calculated value, it is an indication that there is not a sufficient amount of the process liquid 16 above the outlet 17a of the inlet conduit 17 for the carrier gas to substantially completely saturate with the process liquid 16, and that the deposition properties within the processing chamber will therefore start to change.

Therefore, although the height of the upper surface 16a of the process liquid 16 above the outlet 17a of the inlet conduit 17 is the parameter this is preferably ultimately of interest in the present invention, it is appreciated that this height is related to an amount of the process liquid 16 within the ampoule 14, and that this amount of the process liquid 16 may be empirically related to a large number of other measurable parameters. Therefore, although the specific examples below are described in direct relation to the height of the process liquid 16, it is further appreciated that the discussion could also be phrased in terms of other parameters related to the process liquid 16, which parameters relate, either directly or empirically, to the height of the process liquid 16.

To ensure that a sufficient amount of the process liquid vapor is transferred to the MOCVD processing chamber, the amount of the process liquid 16, such as measured by the height h, is preferably maintained above a minimum threshold level. As described in more detail hereinafter, the invention provides for determining the height h of the process liquid 16 based upon the pressure differential ΔP between the input pressure $P_i$ in the input conduit 17 and the output pressure $P_o$ in the output conduit 22.

To determine the pressure differential ΔP, the invention of FIG. 1 includes a pressure differential sensor 35. To indicate the height h of the process liquid 16 based upon the pressure differential ΔP, the invention of FIG. 1 includes an indicator 37. Various embodiments of the pressure differential sensor 35 and the indicator 37 are discussed hereinafter.

Figure 2:
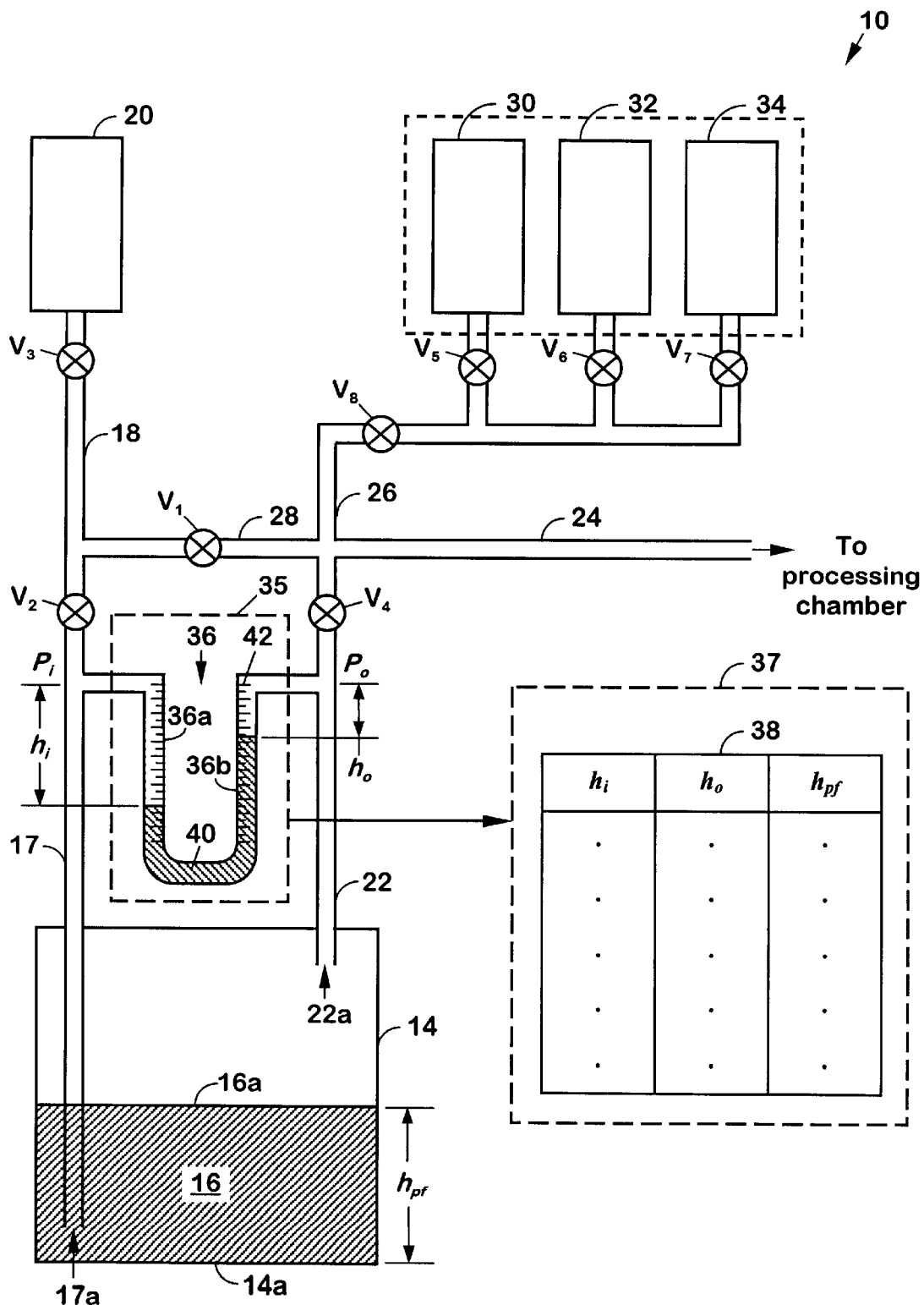
FIG. 2 depicts a liquid height measurement system according to a most preferred embodiment of the present invention.

In a preferred embodiment of the invention, the pressure differential sensor 35 comprises a U-tube manometer 36 having a first arm 36a coupled to the first conduit 17 and a second arm 36b coupled to the second conduit 22, as depicted in FIG. 2. Within the U-tube manometer 36 is manometric fluid 40, preferably having a mass density greater than that of the carrier gas, and which is immiscible in the carrier gas. If the mass density $\rho_{man}$ of the manometric fluid 40 is much greater than the mass density $\rho_c$ of the carrier gas ($\rho_{man} \gg \rho_c$), the pressure differential ΔP may be expressed as:

$$\Delta P = P_i - P_o = (h_i - h_o) \times \rho_{man} \times g, \quad (1)$$

where, as shown in FIG. 2, $h_i - h_o$ is the difference in the levels of the manometric fluid 40 in the two arms 36a and 36b of the U-tube manometer 36, and g is acceleration due to gravity.

The height h of the process liquid 16 in the ampoule 14 is related to the pressure differential ΔP according to:

$$h = \frac{\Delta P - C}{\rho \times g}, \quad (2)$$

where ρ is the mass density of the process liquid and C is a constant based on the configuration of the system, and which preferably accounts for factors such as flow friction.

Combining equations (1) and (2), the height h of the process liquid 16 in the ampoule 14 may be determined according to:

$$h = \frac{(h_i - h_o) \times \rho_{man} - \frac{C}{g}}{\rho}. \quad (3)$$

As depicted in FIG. 2, the two arms 36a and 36b of the U-tube manometer 36 are preferably transparent to allow observation of the manometric fluid 40, and each arm 36a and 36b includes graduated indicia 42 which provide a reference for determining the difference in height ($h_i - h_o$) in each arm. The fluid height indicator 37 of this embodiment is preferably in the form of a conversion table 38. The conversion table 38, which may be in the form of a printed or a computerized look-up table, relates several values of the height difference ($h_i - h_o$) to corresponding values of the height h, according to the relationship of equation (3). Using the conversion table 38, the operator may determine the height h of the process liquid 16 in the ampoule 14 based on the observed height difference ($h_i - h_o$).

However, and as introduced above, it may not be essential to directly determine the height of the process liquid 16, as the degree of saturation of the carrier gas can be empirically related to other parameters. For example, the degree of saturation of the carrier gas can be related directly to a difference of the levels of the manometric fluid 40 within the two arms 36a and 36b of the manometer 36. In this embodiment, it may be determined that when the difference between the levels of the manometric fluid 40 drops down to a given minimum value, it is an indication that there is not a sufficient height of the process liquid 16 above the outlet 17a of the inlet tube 17 for the carrier gas to be sufficiently saturated with the process liquid 16, and that the deposition conditions within the processing chamber will start to change, and that therefore more process liquid 16 should be added to the ampoule 14 before another deposition process is commenced.

One skilled in the art will appreciate that the U-tube manometer 36 may be any one of various known designs, such as a tilted-arm manometer, or a manometer in which one arm has a much larger cross-sectional area than the other arm.

Figure 3:
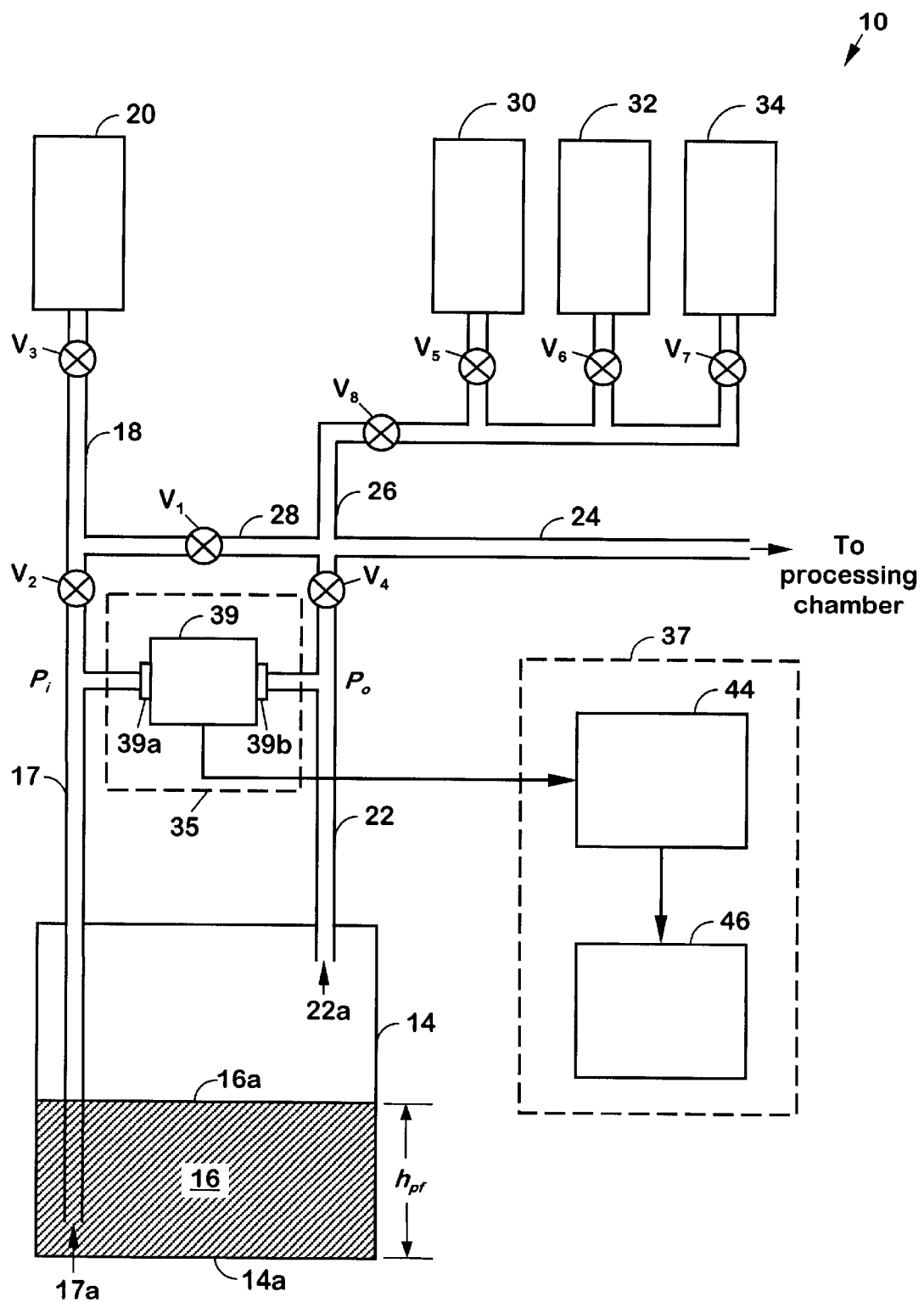
FIG. 3 depicts a liquid height measurement system according to an alternative embodiment of the present invention.

In an alternative embodiment of the invention, the pressure differential sensor 35 comprises a digital manometer 39, as depicted in FIG. 3. The digital manometer 39, such as one of the HHP-2000 series manometers manufactured by Omega Engineering, Inc., includes a first input 39a coupled to the first conduit 17 and a second input 39b coupled to the second conduit 22. The digital manometer 39 preferably senses the pressure differential ΔP and provides a digital readout of the pressure differential ΔP, such as on an integrated display screen. Based on the digital readout, the operator may determine the height h of the process liquid 16 in the ampoule 14 based on the relationship of equation (2). Alternately, the pressure differential ΔP sensed by the digital manometer 39 may be downloaded to a processor 44 which calculates the height h based on equation (2). The calculated value of the height h may then be displayed on a display device 46, such as a computer monitor. Preferably, if the height h drops below a minimum threshold value, the processor 44 generates an alarm indication which is visually and audibly presented to the operator. In this embodiment, the processor 44 and the display device 46 together comprise the fluid height indicator 37.

Figure 4:
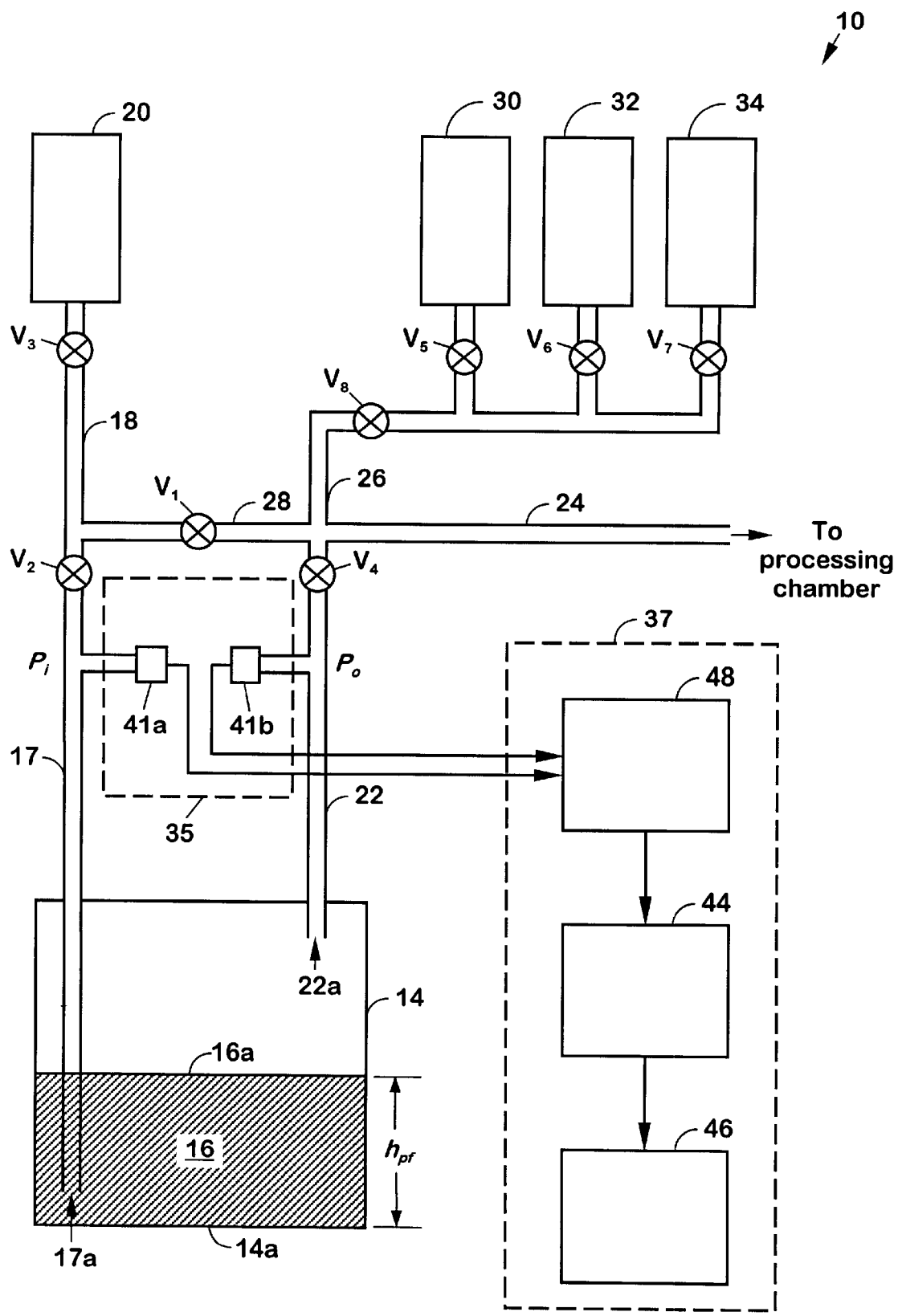
FIG. 4 depicts a liquid height measurement system according to another alternative preferred embodiment of the present invention.

In yet another alternative embodiment of the invention, the pressure differential sensor 35 comprises a pair of pressure sensors 41a and 41b, as depicted in FIG. 4. The pressure sensors 41a and 41b generate pressure signals which are conditioned by an instrumentation interface 48 and provided to a processor 44. Based on the pressure signals, the processor 44 determines tee pressure differential ΔP, and calculates the height h based on equation (2). As described in the previous embodiment, the calculated value of the height h may be displayed on a display device 46, such as a computer monitor. With this embodiment, care must be taken to properly calibrate the pressure sensors 41a and 41b based on a reference pressure value before determining the pressure differential ΔP. In this embodiment, the instrumentation interface 48, the processor 44, and the display device 46 together comprise the fluid height indicator 37.

As mentioned above, it is appreciated that these various devices need not calculate the height of the process liquid 16. For example, the value of the pressure differential ΔP may be directly used, and when the value drops to a predetermined minimum, then the process liquid 16 within the ampoule 14 is replenished.

It is further appreciated that the various embodiments of the invention as described herein may be used to determine the height of practically any liquid through which a gas is being bubbled. Further, the invention is not limited to determining the height of a liquid. The invention is also applicable to determining the height of a high-density gas through which a lower-density gas is being bubbled.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A system for indicating an amount of a process liquid contained within an interior of an ampoule, the system comprising:

a first conduit in selective fluid communication with the interior of the ampoule, the first conduit having a first opening configured for disposal below an upper surface of the process liquid, the first conduit for introducing a carrier gas into the interior of the ampoule, a second conduit in selective fluid communication with the interior of the ampoule, the second conduit having a second opening configured for disposal above the upper surface of the process liquid, the second conduit for receiving the carrier gas from the interior of the ampoule, a pressure differential sensor disposed between the first conduit and the second conduit and in selective fluid communication with the first conduit and the second conduit, for sensing a pressure differential between the first conduit and the second conduit, and an indicator for indicating the amount of the process liquid in the ampoule based at least in part upon the pressure differential between the first conduit and the second conduit wherein the indication of the amount of the process liquid in the ampoule is based at least in part on:

$$h = \frac{\Delta P - C}{\rho \times g},$$

where h is a height of the process liquid in the ampoule, $\Delta P$ is the pressure differential between the first conduit and the second conduit, C is a constant based at least in part on a configuration of the system, $\rho$ is a density of the process liquid, and g is an acceleration due to gravity.

2. The system of claim 1 wherein the amount of the process liquid in the ampoule is expressed as a height of the process liquid from the bottom of the ampoule to the upper surface of the process liquid.

3. The system of claim 1 wherein the amount of the process liquid in the ampoule is expressed as a height of the process liquid from the first opening of the first conduit to the upper surface of the process liquid.

4. The system of claim 1 wherein the pressure differential sensor comprises a U tube manometer containing manometric fluid and having a first arm in fluid communication with the first conduit and a second arm in fluid communication with the second conduit.

5. The system of claim 4 wherein the indicator comprises:

graduated indicia on at least one of the first arm and the second arm of the U tube manometer for indicating a difference in height of the manometric fluid in the first arm and the second arm, and a conversion table for indicating a height of the process liquid in the ampoule based at least in part upon the difference in height of manometric fluid in the first arm and the second arm.

6. The system of claim 4 wherein the indicator comprises graduated indicia on at least one of the first arm and the second arm of the U tube manometer for directly indicating a height of the process liquid in the ampoule based at least in part upon the difference in height of manometric fluid in the first arm and the second arm.

7. The system of claim 1 wherein the pressure differential sensor comprises a digital manometer having a first input in fluid communication with the first conduit and a second input in fluid communication with the second conduit.

8. The system of claim 1 wherein the pressure differential sensor comprises a first pressure sensor in fluid communication with the first conduit and a second pressure sensor in fluid communication with the second conduit.

9. The system of claim 1 wherein the indicator comprises a digital processor for calculating, based upon the pressure differential between the first conduit and the second conduit, a height value indicative of a height of the process liquid in the ampoule.

10. A chemical vapor deposition system including the system of claim 1 for indicating an amount of a process liquid.

11. In an integrated circuit processing apparatus of the type including an ampoule having an interior for containing a process liquid, a first conduit in selective fluid communication with the interior of the ampoule, the first conduit having a first opening configured for disposal below an upper surface of the process liquid, the first conduit for introducing a carrier gas into the interior of the ampoule, a second conduit in selective fluid communication with the interior of the ampoule, the second conduit having a second opening configured for disposal above the upper surface of the process liquid, the second conduit for receiving the carrier gas from the interior of the ampoule, the improvement comprising:

a pressure differential sensor disposed between the first conduit and the second conduit and in selective fluid communication with the first conduit and the second conduit, for sensing a pressure differential between the first conduit and the second conduit, and an indicator for indicating an amount of the process liquid in the ampoule based at least in part upon the pressure differential between the first conduit and the second conduit wherein the indication of the amount of the process liquid in the ampoule is based at least in part on:

$$h = \frac{\Delta P - C}{\rho \times g},$$

where h is a height of the process liquid in the ampoule, $\Delta P$ is the pressure differential between the first conduit and the second conduit, C is a constant based at least in part on a configuration of the system, $\rho$ is a density of the process liquid, and g is an acceleration due to gravity.

12. The apparatus of claim 11 wherein the pressure differential sensor comprises a U tube manometer containing manometric fluid and having a first arm in fluid communication with the first conduit and a second arm in fluid communication with the second conduit.

13. The apparatus of claim 12 wherein the indicator comprises:

graduated indicia on at least one of the first arm and the second arm of the U tube manometer for indicating a difference in height of the manometric fluid in the first arm and the second arm, and a conversion table for indicating a height of the process liquid in the ampoule based at least in part upon the difference in height of manometric fluid in the first arm and the second arm.

14. The apparatus of claim 12 wherein the indicator comprises graduated indicia on at least one of the first arm and the second arm of the U tube manometer for directly indicating a height of the process liquid in the ampoule based at least in part upon the difference in height of manometric fluid in the first arm and the second arm.

15. A chemical vapor deposition system including the pressure differential sensor and the indicator of claim 11.

16. A method for determining an amount of a process liquid in an ampoule of the type having an interior for containing a process liquid, a first conduit in selective fluid communication with the interior of the ampoule, the first conduit having a first opening configured for disposal below an upper surface of the process liquid, the first conduit for introducing a carrier gas into the interior of the ampoule, a second conduit in selective fluid communication with the interior of the ampoule, the second conduit having a second opening configured for disposal above the upper surface of the process liquid, the second conduit for receiving the carrier gas from the interior of the ampoule, the method comprising the steps of:

measuring a pressure differential between the first conduit and the second conduit, and determining the amount of the process liquid in the ampoule based at least in part upon the pressure differential between the first conduit and the second conduit wherein the determining is based at least in part on:

$$h = \frac{\Delta P - C}{\rho \times g},$$

where h is a height of the process liquid in the ampoule, $\Delta P$ is the pressure differential between the fist conduit and the second conduit, C is a constant based at least in part on a configuration of the ampoule, $\rho$ is a density of the process liquid, and g is an acceleration due to gravity.

17. The method of claim 16 further comprising the step of expressing the amount of the process liquid in the ampoule as a height of the process liquid in the ampoule.

\* \* \* \* \*